April 8, 1941.   O. KLEINSCHMIDT ET AL   2,237,740
MEANS FOR FEEDING FOLDED SIGNATURES
Filed Feb. 4, 1939   9 Sheets-Sheet 1

INVENTORS
O. KLEINSCHMIT
W. GEISSLER
BY
Young, Emery & Thompson
ATTYS.

April 8, 1941.  O. KLEINSCHMIDT ET AL  2,237,740
MEANS FOR FEEDING FOLDED SIGNATURES
Filed Feb. 4, 1939    9 Sheets-Sheet 3

Fig. 3.

INVENTORS
O. KLEINSCHMIT
W. GEISSLER
BY
Young, Emery & Thompson
ATTYS.

April 8, 1941.   O. KLEINSCHMIDT ET AL   2,237,740
MEANS FOR FEEDING FOLDED SIGNATURES
Filed Feb. 4, 1939   9 Sheets-Sheet 5

INVENTORS
O. KLEINSCHMIT
W. GEISSLER
BY
Young, Emery & Thompson
ATTYS

April 8, 1941.  O. KLEINSCHMIDT ET AL  2,237,740
MEANS FOR FEEDING FOLDED SIGNATURES
Filed Feb. 4, 1939  9 Sheets-Sheet 8

INVENTORS
O. KLEINSCHMIT
W. GEISSLER
BY
Young, Emery & Thompson
ATTYS.

Patented Apr. 8, 1941

2,237,740

UNITED STATES PATENT OFFICE 2,237,740

MEANS FOR FEEDING FOLDED SIGNATURES

Oskar Kleinschmit and Walter Geissler, Leipzig, Germany, assignors to Gebrüder Brehmer, Leipzig, Germany Application February 4, 1939, Serial No. 254,704
In Germany February 12, 1938

9 Claims. (Cl. 270—54)

The present invention relates to the feeding of folded signatures onto the saddle of signature-handling machines, particularly those in which the signature is placed astride a swinging saddle which carries it to the stitching position. The signatures are closed from the preceding folding operation and if the stitching is to be effected through the centre of the fold, they must be opened and placed astride the saddle.

One object of the present invention is to feed the individual signatures one after the other from a pile in a continuous manner and in such a way that the signature which initially lies substantially horizontal is progressively pivoted until it is brought to hang astride the saddle of the stitching machine and for this purpose is separated from the pile and is opened in the centre during its travel without interrupting its continuous motion.

Another object of the invention is to effect the reliable opening of a signature which lies approximately horizontally and thereafter to turn it progressively so that finally the signature hangs astride a support, from which position it can readily pass to the saddle.

According to one embodiment of the invention an initial opening at one corner of the signature is effected by making use of the projecting half of the signature which is usually obtained during folding, an adjustable auxiliary opener being so adjusted that it encounters only the projecting half and deflects it appropriately in such way that the signature is opened at the corner and the main opener is able to enter and complete the opening operation. If this projecting edge resulting from normal folding is too small to permit of this mode of opening, it can be increased during the folding operation on the folding machine so that the difference between the two halves of the signature is sufficient to ensure that the desired effect is obtained. It may be necessary to allow for this asymmetrical folding when setting the type in order to obtain correct centering of the print on the pages of the folded signature. If it is a matter of handling normal cross folded signatures, then a small pair of suction wheels can be positioned at the point of the projecting edge in front of the adjustable opener, these rollers opening the signature so that the opener can enter. The desired effect could also be obtained with a single roller because fundamentally only one half of the signature needs to be displaced somewhat. When using superimposed suction rollers which are adjustable in their distance from the side guide of the feed arrangement in accordance with the size of the signatures, it is advantageous to make the separation of one from the other adjustable and to give a timed up and down movement.

Advantageously the suction rollers can be adjusted laterally in such way that if desired they lie entirely outside the range of the signatures, so that in accordance with the nature of the folded signatures one or the other device can be employed for effecting the preliminary opening. Feed rollers could be carried on the shafts of the suction rollers in the vicinity of the side guide to effect or assist the complete advance of the signature over the opener.

The invention will now be described more fully by way of example with reference to the accompanying drawings in which:

Figs. 4 to 14 are diagrammatic detail views showing progressive stages in the operation of the signature opening device:

Figs. 15 and 16 are diagrammatic detail views of a modification incorporating a suction-operated sheet opening device:

Figure 1:
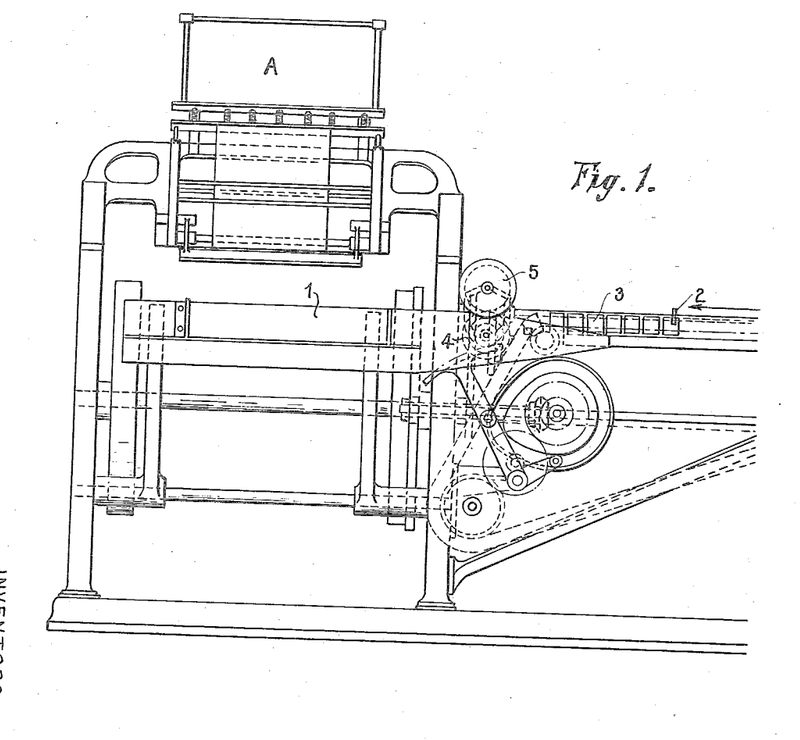
Figs. 1 and 2 are a general front elevation of an automatic book stitching machine.
Figure 2:
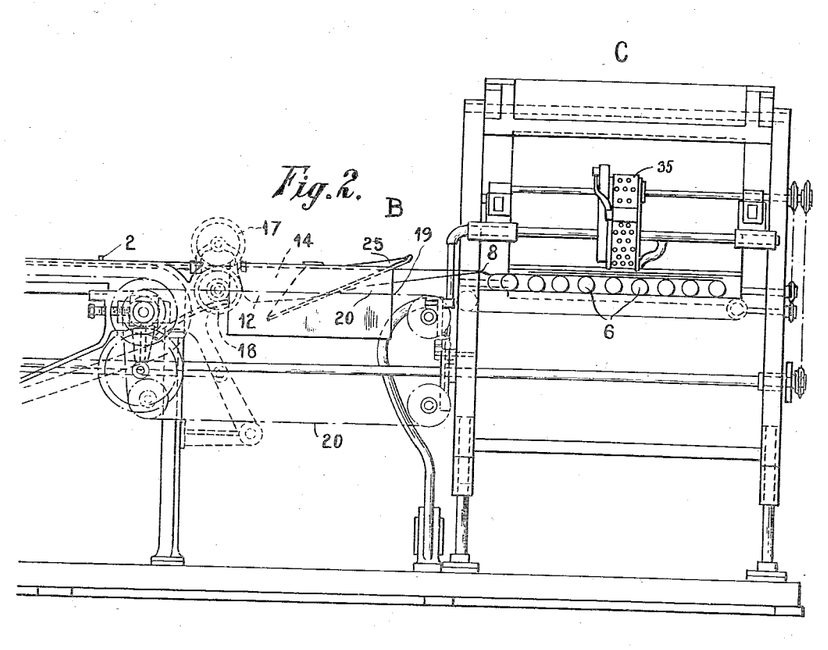

In the machine shown in Figs. 1 and 2, A is the actual book stitching mechanism which may be of any suitable construction, B is the device for opening the signatures for presentation to the stitching mechanism and C is an arrangement for feeding single signatures to the opening device.

The book stitching mechanism A (Fig. 1) comprises a swinging saddle 1 moving between a receiving position and the stitching position. The individual signatures are placed astride the saddle 1 in the receiving position by being slipped onto it endwise from an endless chain 3 on which they are conveyed by means of driving devices 2 secured on the chain. The two timed rollers 4, 5 advance the signatures from the chain onto the saddle 1 where they are registered. The chain 3 constitutes a lateral extension of the stitching saddle 1 when the latter is in its receiving position. The spacing of the driving devices 2 on the chain 3 corresponds to the distance the chain is fed during each cycle of operations of the stitching mechanism. The saddle 1 is swung into the stitching position so that the sheet lying on the saddle 1 is brought beneath the needles of the stitching mechanism and the signature is stitched at the top, whereupon the saddle swings back empty into the receiving position.

Figure 3:
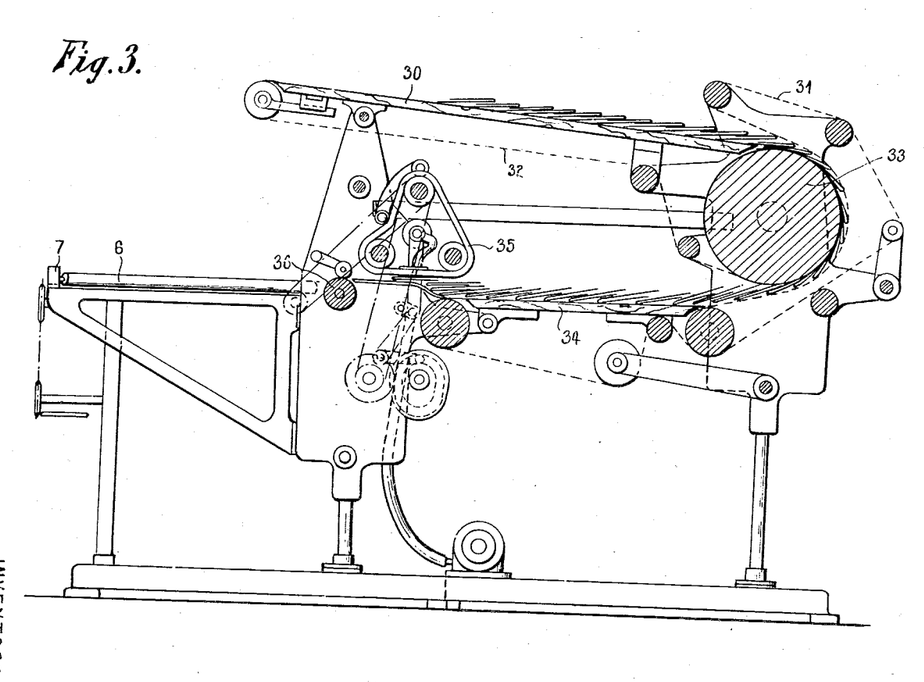
Fig. 3 is an end view of the signature feeding and opening mechanisms.

In the example shown in the drawings (Figs. 2 and 3) the arrangement C for feeding the signatures comprises a pile reversing feed. The signatures are placed in overlapping relationship on the upper table 30 and by means of tapes 31, 32 are fed round the reversing roller 33 so that on the lower feed table 34 a pile of overlapping signatures is obtained with the leading signature uppermost. A timed suction feed device 35 serves to separate the leading signature from the pile on the table 34 and to advance it to feed rollers 36 which deliver it onto an oblique roller feed table 6 where it is registered with its folded edge against the side guide 7 and is fed along the side guide to the opening device B. In this way individual signatures are fed in timed succession to the opening device from the pile which is replenished on the table 30.

The opening device B comprises a main opener 9 which tapers towards the edge 13 on which the signature is incident and which advantageously is arranged somewhat obliquely with respect to the leading edge of the signature. The edge 13 has a length exceeding that of the leading edge of the signature. This opener 9, which is secured to the frame of the machine, carries a rearwardly extending saddle-shaped extension 14 which is parallel to the side guide 7. The oblique setting of its edge 13 may be adjustable. The auxiliary opener 8 is wedge-shaped and is adjustably mounted on the opener 9. The edge of the wedge facing the oncoming signature is so arranged that it can pass between the two halves of the signature.

Figures 4, 5, 17, 18:
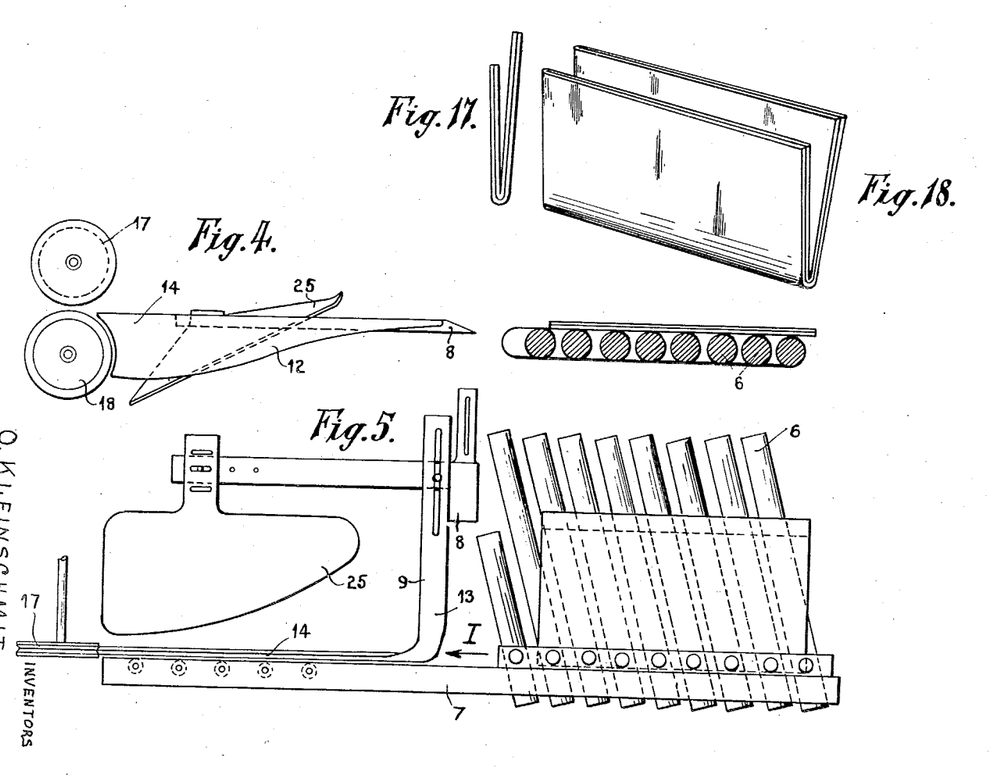
Fig. 4 being a side elevation showing the signature before reaching the opening device.
Fig. 5 a corresponding plan view.
Fig. 17 is an end view of an unequally folded signature
Fig. 18 is a corresponding perspective view.
Figure 7:
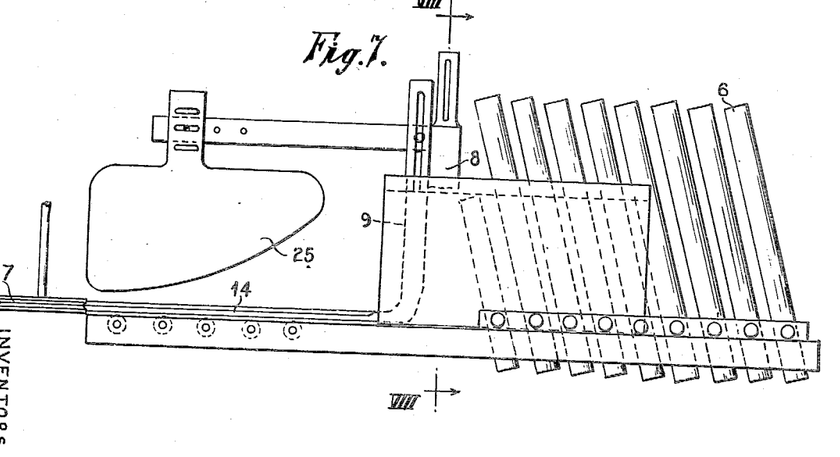
Fig. 7 a corresponding plan view.
Figure 8:
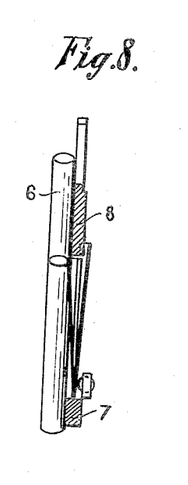
Fig. 8 a section substantially along the line VIII—VIII of Fig. 7.
Figure 9:
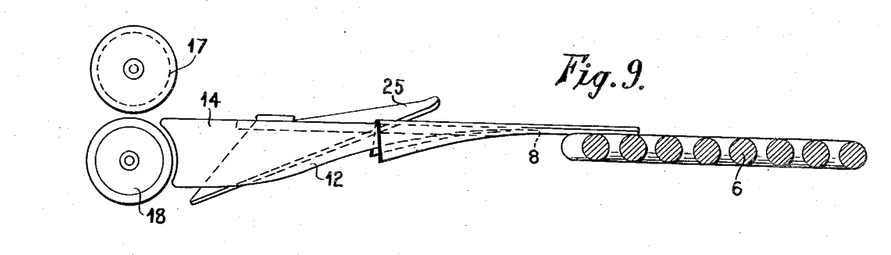
Fig. 9 a side elevation showing an intermediate stage of the opening operation.
Figure 10:
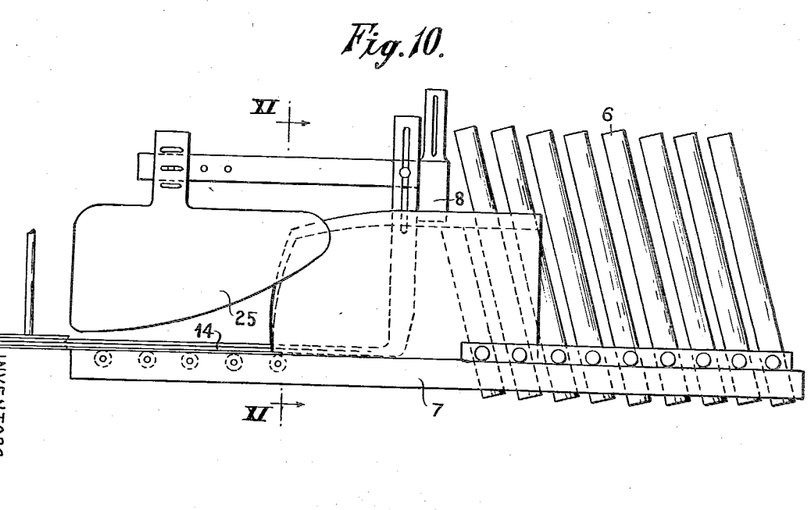
Fig. 10 a corresponding plan view.
Figure 11:
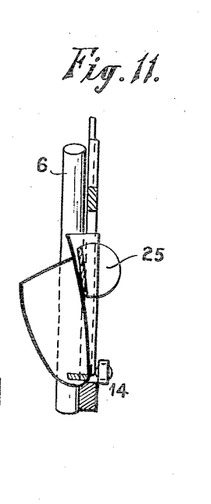
Fig. 11 a section substantially along the line XI—XI of Fig. 10.
Figures 12, 13, 14:
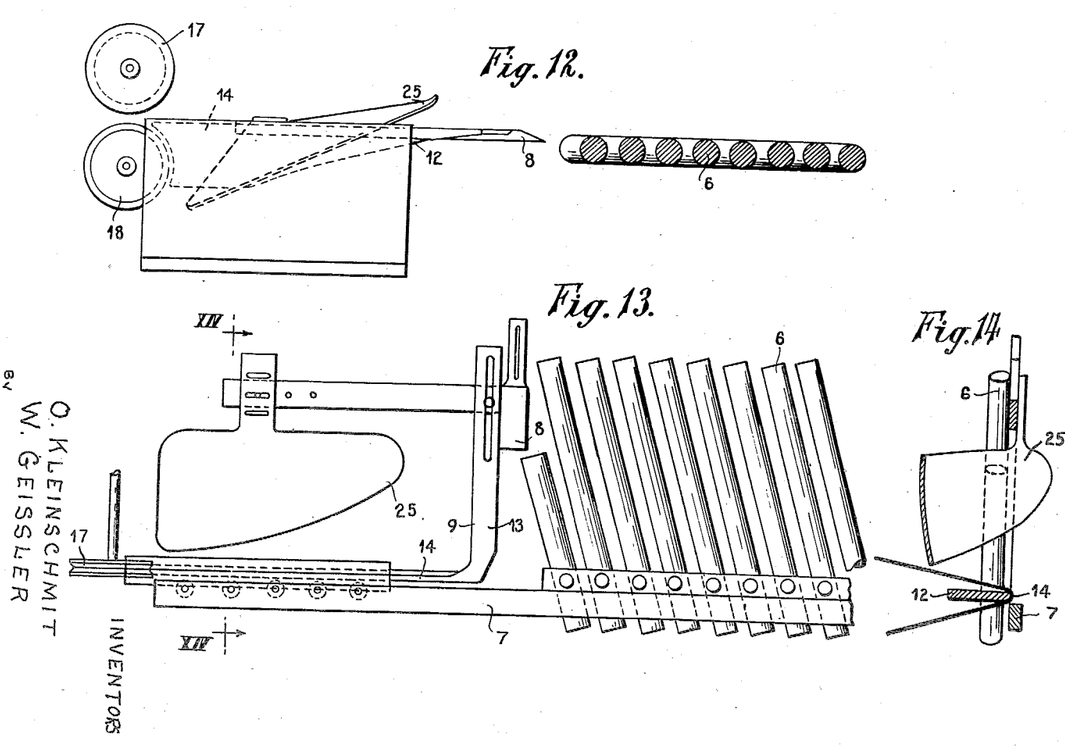
Fig. 12 a side elevation showing the completely opened signature.
Fig. 13 a corresponding plan view.
Fig. 14 a section substantially along the line XIV—XIV of Fig. 13.

If it is desired to open in this way signatures consisting of individual sheets placed one inside the other, then each such signature must be folded somewhat non-symmetrically (Fig. 17) so that the upper half projects somewhat beyond the lower half. The auxiliary opener 8 is then so adjusted that only the projecting upper half of the travelling signature encounters the wedge and is bent upwardly somewhat. It is then possible for the raised edge of the signature to slide also over the edge 13 of the opener 9 and in this way the opener 9 enters the signature almost up to the fold which is guided by the side guide 7. In the continued movement of the signature over the opener 9, the folded edge of the signature slides on the extension 14, whereas the edge parallel to the folded edge encounters the oblique guide 25 and there is bent downwardly somewhat at the leading corner. The guide 25 is adjustable longitudinally and transversely so that the desired action on the signature is obtained. As soon as the signature has passed entirely beneath the transverse portion of the opener 9 which is provided with the edge 13, it is turned by its own weight and by the action of the oblique guide 25 until it hangs astride the saddle-like extension 14. The lugs 19 of an auxiliary chain 20 (Figs. 2 and 3) bring the signature into engagement with the lugs 2 on the chain 3 whereby the signature is carried to the stitching mechanism as described above. In place of the auxiliary chain a pair of rollers 17, 18 (shown in dotted lines in Fig. 2) could be provided for advancing the opened signature on to the chain 3. The saddle-like extension 14 may be provided with a downwardly extending wedge-shaped surface 12 which serves to depress the lower half of the signature so as to assist the turning of the signature from the horizontal position (Fig. 7) into the vertical position (Fig. 14). To eliminate irregularities in the travel of the signatures to the opening device B a stop which is moved up and down periodically may be positioned in the path of the signatures for instance at the delivery end of the feed table 6 to arrest signatures which arrive too soon and to release the path of travel for the signatures at the appropriate time by being withdrawn beneath the path of travel. Such an arrangement is incorporated in the embodiment shown in Figs. 15 and 16. In so far as identical parts are used in this embodiment and that previously described, they are identified by the same reference numerals and no further description thereof is needed. The stop 21 is movable vertically between the feed table 6 and the opening device 8, 9, 14. The stop 21 is cam controlled in well-known manner so as to give the desired timed sequence to the signatures. The controlled feed can also be assisted by a timed feed roller 22 which operates to feed the signature as soon as it is released by the stop 21.

The arrangement which will now be described with reference to Figs. 15 and 16 can be used to enable the handling of signatures in which folding so that one half projects is not possible, as may for example be the case with normally folded signatures which are united at the top by a cross fold.

Mounted on the shafts 23, 24 are laterally adjustable oppositely rotating suction wheels 10, 11 which are adjustable in their separation from one another. They are arranged at the edge of the signature remote from the side guide 7 and travel over a narrow marginal strip of the signature. By the application of suction to the wheels 10, 11 they are caused to engage the corner of the upper and lower halves respectively and to open the signature by their rotation. The opener 9 can then enter the gap produced between the two halves and complete the opening of the signature as described above. Instead of employing a pair of suction wheels as an auxiliary opening device, a single wheel can be used whereby the upper half of the signature is bent upwardly or the lower half is bent downwardly. It is then advantageous to make the edge 13 of the opener 9 adjustable in height so that it always penetrates with certainty into the pre-opened gap, thereby ensuring the correct opening of the signature.

Figure 6:
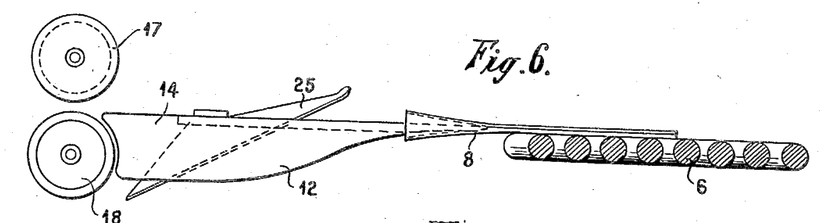
Fig. 6 a side elevation showing the initial stage of the opening operation.

The side guide 7 can suitably be made adjustable in the manner customary on oblique roller feed tables such as that shown at 6.

Its distance from the centre of the saddle of the extension 14 can then be adjusted in such way that the downward pivotation of the signature is effected with a minimum lateral displacement of the folded edge of the signature.

Figure 15:
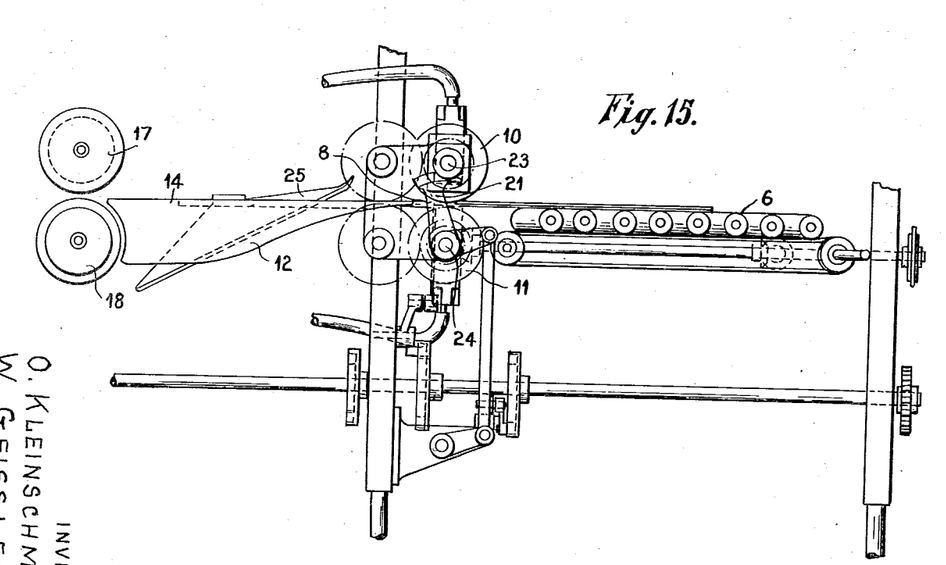
Fig. 15 being a side elevation.
Figure 16:
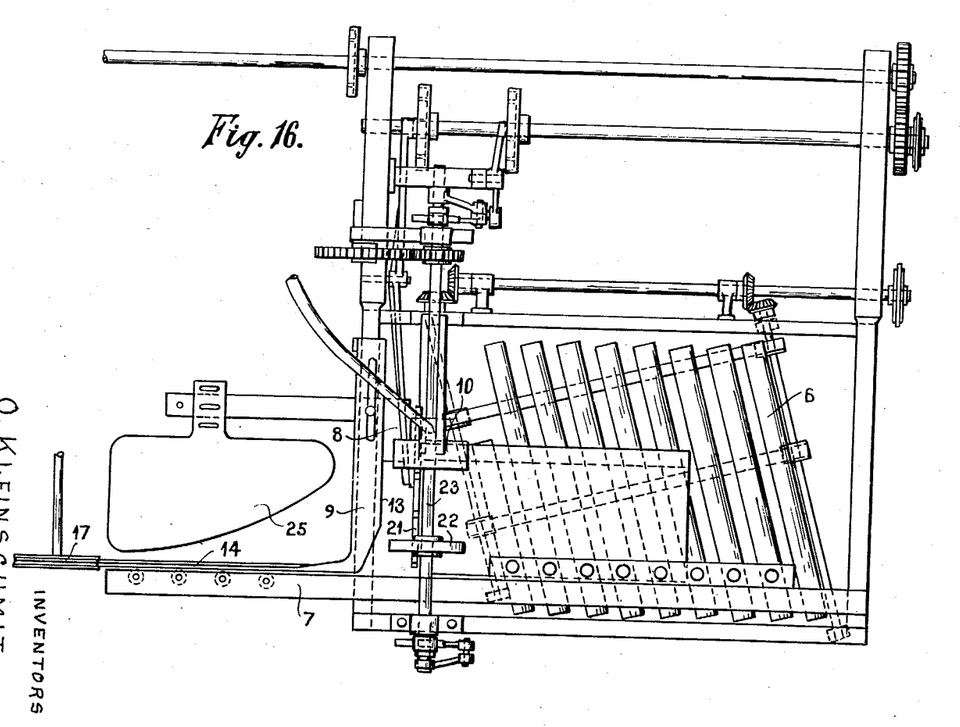
Fig. 16 a corresponding plan view.

As will be apparent from Figs. 15 and 16 the suction devices for initiating the opening of the signatures may be associated with the wedge-shaped device to ensure the reliable entry of the wedge 8 between the two halves of the signature, whereafter the opening is completed by the main opening device 9, 14 as previously described.

We claim:

1. Means for feeding folded signatures to the saddle of a signature handling machine, comprising a feed table whereby signatures lying approximately flat are fed singly in succession in the direction of the folded edge, a device operating exclusively on the leading edge of the signature to separate the two halves thereof at the corner remote from the folded edge, a separate and fixed opening device adapted to pass between the two halves of the signature, a saddle-like extension to said opening device substantially in alignment with the line of travel of the folded edge, and means for feeding the signature over said opening device and saddle-like extension.

2. Means for feeding folded signatures to the saddle of a signature handling machine, comprising a feed table, a side guide, means feeding single signatures to said table with the folded edge against the side guide, a device operating exclusively on the leading edge of the signature at the delivery end of said table to separate the two halves of the signature at the corner remote from the side guide, a separate and fixed opening device adapted to pass between the two halves of the signature, a saddle-like extension to said opening device substantially in alignment with the line of travel of the folded edge, and means for feeding the signature over said opening device and saddle-like extension.

3. Means for feeding asymmetrically folded signatures to the saddle of a signature handling machine comprising means for feeding single signatures in a substantially horizontal position parallel to the folded edge, a wedge-shaped member engaging exclusively the projecting portion of the larger half of the signature and moving it away from the smaller half in the travel of the signature, a horizontal blade extending from adjacent the folded edge of the signature to beyond the wedge-shaped member immediately behind said wedge-shaped member in the direction of travel of the signature, a saddle-like portion extending from the horizontal blade substantially in alignment with the folded edge and in alignment with the saddle of the signature-handling machine, means for advancing the signature past said blade and along said saddle-like portion, and means for transferring the signature from said saddle-like portion to the aligned saddle.

4. A signature opening device comprising a mechanism feeding signatures in a horizontal plane, a horizontal blade extending transversely to the direction of feed from adjacent the line of feed of the folded edge to beyond the opposite edge of the signature and adapted to pass between the two halves of the signature, a saddle-like member extending from said blade substantially in alignment with said line of feed, means for feeding the signature over the blade and along the saddle, and a downwardly directed surface beneath said saddle adapted to deflect downwardly that half of the signature which passes beneath the blade.

5. A signature opening device comprising a feed table, a side guide associated with said table, a wedge-shaped member spaced from the said guide at the delivery end of the feed table and adapted to pass between the two halves of a signature fed with its folded edge against the side guide, a blade extending from said wedge substantially up to the side guide, a saddle-like member extending parallel to the side guide from the end of the blade adjacent the side guide, means for feeding signatures over the blade and along the saddle-like member, and guide devices adapted to engage the signature adjacent its free edge and to deflect it downwardly to cause it to assume a position astride the saddle-like member.

6. A signature opening device as claimed in claim 5 wherein suction means assisting the separation of the two halves of the signature are assocaited with the feed table in front of the wedge-shaped member.

7. Means for feeding folded signatures to the saddle of a signature-handling machine comprising a feed table, a side guide associated with the feed table, a blade mounted at the delivery end of the feed table to pass between the two halves of a signature fed over the feed table, a wedge member adjustably mounted on the blade between the blade and the feed table at a point spaced from the side guide, a saddle-like member extending from the blade parallel and adjacent to the side guide, a signature deflecting member adjustable relatively to the side guide and adapted to deflect a signature progressively from a horizontal to a vertical position by downward rotation about the saddle member during its travel along said saddle member, a feed chain adapted to propel the signature over the blade and along the saddle member to a separate feed chain receiving the opened signatured astride and transferring them to the saddle of the signature handling machine.

8. Signature feeding means according to claim 7 comprising means for delivering single signatures to the feed table with the folded edge against the side guide and suction means adjustable transversely of the table and operating on the signatures during their travel over the table to effect a preliminary opening of the two halves of the signature before the leading edge encounters the wedge member.

9. Signature handling mechanism comprising a signature stitching machine with a swinging saddle, and signature feeding means adapted to feed the signature with its folded edge constantly in substantial alignment with the saddle in its signature-receiving position, said feeding means comprising a horizontal feed table, means for entering the signature between the two halves thereof up to the folded edge while the signature is in the horizontal position, guides causing the signature during its travel to turn about its folded edge from a horizontal position into a vertical position astride a saddle member supporting the signature at its folded edge, and means for receiving said signature from the saddle member and placing it astride the swinging saddle while the latter is in its signature-receiving position.

OSKAR KLEINSCHMIT.
WALTER GEISSLER.